US Patent [19]
Mohri

[11] Patent Number: 4,977,045
[45] Date of Patent: Dec. 11, 1990

[54] SOLID-STATE ELECTROLYTIC BATTERY
[75] Inventor: Motoo Mohri, Nara, Japan
[73] Assignee: Sharp Kabushiki Kaisha, Osaka, Japan
[21] Appl. No.: 467,998
[22] Filed: Jan. 22, 1990

Related U.S. Application Data

[63] Continuation of Ser. No. 311,404, Feb. 15, 1989, abandoned, which is a continuation of Ser. No. 192,132, May 9, 1988, abandoned, which is a continuation of Ser. No. 922,800, Oct. 24, 1986, abandoned, which is a continuation of Ser. No. 710,371, Mar. 11, 1985, abandoned.

[30] Foreign Application Priority Data

Mar. 14, 1984 [JP] Japan ................... 59-49674

[51] Int. Cl.$^5$ ................ H01M 6/18; H01M 10/36
[52] U.S. Cl. ................... 429/192; 429/104; 429/193; 429/224
[58] Field of Search ............ 429/33, 104, 101, 105, 429/193, 192; 420/900

[56] References Cited

U.S. PATENT DOCUMENTS

| | | | |
|---|---|---|---|
| 3,266,940 | 8/1966 | Caesar | 429/33 |
| 3,276,910 | 10/1966 | Grasselli et al. | 429/33 |
| 3,379,571 | 4/1968 | Piret et al. | 429/33 |
| 4,024,036 | 5/1977 | Nakamura et al. | 429/33 |
| 4,112,199 | 9/1978 | Dunlop et al. | 429/101 |
| 4,178,418 | 12/1979 | Croset et al. | 429/101 |
| 4,179,491 | 12/1979 | Howe et al. | 429/33 |

OTHER PUBLICATIONS

Gutjahr et al., "A New Type of REversible Negative . . . ," 8th Int. Power Sources Conf., pp. 79-91, 1974.

Primary Examiner—Donald L. Walton
Attorney, Agent, or Firm—Birch, Stewart, Kolasch & Birch

[57] ABSTRACT

The preferred embodiment provides a unique solid-state electrolytic battery featuring high reliability and an extremely durably service life. The battery is capable of generating a large amount of dischargeble current and can be satisfactorily charged and discharged using the activated hydrogen-stored alloy/materials. This unique solid-state electrolytic battery incorporates a cathode comprised of activated hydrogen-stored alloy storing metallic-hydrogenated hydrogen; a solid-state electrolyte comprised of hydrogen-ion conductive elements; and an anode containing an activated guest material, primarily hydrogen-ions.

19 Claims, 2 Drawing Sheets

SOLID-STATE ELECTROLYTIC BATTERY

This application is a continuation of copending application Ser. No. 311,404 filed on Feb. 15, 1989, now abandoned, which was a continuation of application Ser. No. 192,132 filed on May 9, 1988, now abandoned, which was a continuation of application Ser. No. 922,800 filed Oct. 24, 1986, now abandoned, which was a continuation of application Ser. No. 710,371 filed Mar. 11, 1985, now abandoned.

BACKGROUND OF THE INVENTION

The present invention relates to the solid-state electrolytic battery composed of activated solid-state anode material, solid-state electrolytic material, and activated solid-state cathode material.

As a result of the recent development of semiconductive element processing technology and associated application technology, a variety of electronic apparatuses have helped to gradually decrease power consumption. At the same time, reflecting the tendency towards decreased power consumption, there is a growing demand to realize still smaller and thinner battery configurations for use in modern electronic apparatuses. There is also a strong demand to increase battery reliability. Solid-state electrolytic batteries show promise of satisfying these requirements. Basically, the solid-state electrolytic battery uses solid-state electrolyte containing ionized conductive material. Thus, electrolyte never leaks from the battery. Even highly-automated semiconductive element processing technology can also be applied. This is a great advantage in realizing the mass production of solid-state electrolytic batteries. In fact, solid-state electrolytic batteries incorporating either an ionized silver conductive element, an ionized copper conductive element, or an ionized lithium conductive element have already been developed. Of these, the batteries using either an ionized silver conductive element or an ionized copper conductive element offer relatively strong ionic conductivity in the solid-state electrolyte. Thus, a large amount of current can be discharged. Conversely, solid-state electrolytic batteries using an ionized lithium conductive element contain high-density energy and output a high voltage. Nevertheless, since the solid-state electrolyte available for the ionized lithium conductive element is not sufficiently conductive, such batteries cannot discharge a large amount of current. In addition, since lithium itself absorbs a large amount of moisture, an extremely skilled technique is required to properly seal such batteries. This involves a complex production process while the battery itself requires a large volume as well. These disadvantages ultimately make it difficult to realize a smaller, thinner design which should be one of the advantageous features of solid-state electrolytic batteries. Solid-state electrolytic batteries containing either ionized silver, ionized copper, or ionized lithium electrolyte cause the conductive materials to precipitate themselves in branches as the charge is reduced. This adversely affects the service life and constricts durable discharge. As a result, such obviously defective solid-state electrolytic batteries have not yet been marketed.

OBJECTS AND SUMMARY OF THE INVENTION

In light of the circumstances thus described, the present invention aims to realize a highly reliable and durable solid-state electrolytic battery incorporating hydrogen-stored alloy. This battery should be capable of discharging a large amount of current and maintaining a very satisfactory charge/discharge cycle.

It is well known that hydrogen in vapor form can be stored in a hydrogen-stored alloy at a specific temperature and pressure so as to co-exist with the alloy. The hydrogen-stored alloy storing the hydrogen in the hydrogenated metal can then discharge hydrogen in vapor form by varying the temperature and pressure at specific levels. In addition, it was also proposed that the hydrogen-stored alloy be electrochemically applied to the cathode of an alkali battery by converting the alkaline solution into electrolyte. The present invention provides an entirely new solid-state electrolytic battery incorporating a hydrogen-stored alloy for the anode, a solid-state electrolyte activating proton for the conductive ion, and a cathode anode comprised of material containing hydrogen as a guest element. When the cathode is composed of such material that can reverse-feed hydrogen as guest material, the solid-state electrolytic battery embodied by the present invention can repeatedly charge and discharge as required. Since activated hydrogen-stored alloy is used in the anode, the electrode causes the diffused hydrogen to share in the reaction, thus effectively preventing precipitation of the reduced conductive material in branches otherwise caused by repeated charge/discharge cycles when using conventional precipitation-type electrodes that apply the metallic ion to the conductive elements. An extremely durable charge/discharge life results. The solid-state electrolytic battery embodied by the present invention still features the following advantages. Neither the hydrogen-stored alloy of the anode nor the solid-state electrolyte and the activated materials of the cathode absorbs moisture, thus stabilizing the battery's atmosphere. Since all battery constituents are solid-state, the battery can be easily sealed. Yet such solid-state electrolyte can be used to build extremely thin units or to create multiple layers, thus eventually providing greater industrial potential than any conventional battery. It is suggested that the hydrogen-stored alloy for use as the anode be comprised of either $LaNi_5$, $CaNi_5$, or TiFe each being a combination of Group Ia through Va elements of the Periodic Table generating hydrogen and stably-hydrogenated materials and Group VIa through VIII elements of the Periodic Table which cannot generate hydrogen under normal conditions. In addition to these, any kind of hydrogen-stored material may be employed indefinitely. For example: hydrogenated-stored material (alloy) provided with a third or fourth additional element, hydrogen-stored material mainly composed of IIIb or IVb elements, or the hydrogen-stored materials mentioned above have been converted into an amorphous configuration by normal means. Likewise, any kind of amorphous and/or crystalline material may also be indefinitely used as the solid-state electrolyte. For example: phosphotungstate hydrate ($P_2O_5$ $24WO_3 29H_2O$), stannic oxide ($SnO_2$ $nH_2O$), antimony pentaoxide ($Sb_2O_5$ $nH_2O$), urany phosphorate ($HUO_2$ $PO_4$ $4H_2O$), zirconium oxide ($ZrO_2$ $nH_2O$), aluminosilicate, composite matrix materials which are added with cationic materials that contain proton, high-polymer solid state electrolyte composed of perfluorocarbon element, etc. In addition, to these, any of the following materials that accepts hydrogen may be optionally used: di-chalcogenides of transition metals such as $TiS_2$ or $NbS_2$, tri-chalcogenides such as TiS₃ or NbS₃, sulfide of a higher order, bronze compound such as WO₃, non-stoichimetric oxide such as Cr₃O₈, rutile analogue compound such as MnO₂, etc. By adequately combining the variety of conditions needed for the anode, electrolyte, and the cathode, both the output voltage and current can be determined.

DETAILED DESCRIPTION OF THE PREFERRED EMBODIMENTS

Figure 1:
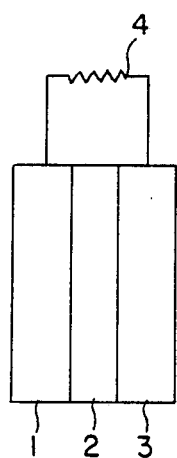
FIG. 1 is a simplified diagram of the solid-state electrolytic battery incorporating the preferred embodiments of the present invention.

FIG. 1 is a simplified diagram of the solid-state electrolytic battery incorporating the preferred embodiment of the present invention. In FIG. 1, reference number 1 indicates the anode comprised of the hydrogen-stored material, 2 indicates the solid-state electrolyte provided with hydrogenionic conductivity and 3 indicates the cathode comprised of materials capable of internally accommodating hydrogen as a guest material. The anode 1 and the opposite cathode 3 are connected through the conductive material 4, thus causing hydrogen stored in the hydrogen-stored material to start reacting in the manner indicated by the following formula so that hydrogen ions can be released into the solid-state electrolyte.

$$\text{Metal: } H_x \rightarrow \text{Metal} + xH^+ + e^- \quad (1)$$

where metal denotes the hydrogen-stored material which, after imparting electron to hydrogen, stores hydrogen in a state very close to the anion. The hydrogen-ion released by the formula (1) proceeds in the direction of the cathode via the solid-state electrolyte. On arrival at the cathode, the hydrogen ion causes the following reaction (2) to occur, thus absorbing hydrogen.

$$xH^+ + AB_n + xe^- \rightarrow H_xAB_n \quad (2)$$

ABn represents the material that absorbs hydrogen as a guest material. Since ABn is electron-receptive, it absorbs hydrogen in a state very close to that of the cationic. Actually, it is not yet very clear whether the hydrogen ion exists in the state of H⁺ or in the hydronium ion H₃O⁺ hydrated with water. Now, assuming that the conductive element is H₃O⁺, the anode will cause the following reaction to take place.

$$\text{Metal} - H_x + xH_2O \rightarrow \text{Metal} + xH_3O^+ + xe^- \quad (1)'$$

whereas the cathode will cause the following reaction:

$$xH_3O^+ + AB_n + xe^- \rightarrow H_xAB_n + H_2O \quad (2)'$$

However, the present invention does not define whether such water hydrated with hydrogen ions is comprised of crystalized water in the solid-state electrolyte or contains free water in the solid-state electrolyte. The present invention also does not define whether such hydrogen absorbed as a guest material is perfectly typo-chemical, or whether it is accompanied by a structural variation in the host material or a state close to that of the compound. Even when the discharge reactions takes place according to formulas (1) and (2) or (1)' and (2)', the battery's overall reaction during discharge is as shown in the formula (3) below.

$$\text{Metal} - H_x + AB_n \rightarrow H_xAB_n \quad (3)$$

Note that the reverse reaction takes place during charge.

EXAMPLE 1

Figure 2:
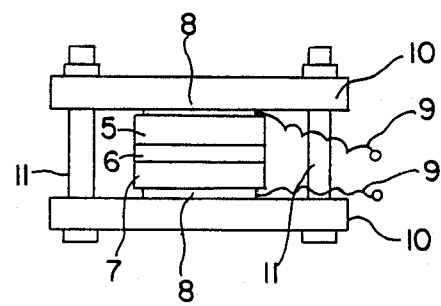
FIG. 2 is the production process reflecting one of the preferred embodiments of the present invention.

A typical procedure for manufacturing the hydrogen-stored alloy is introduced below. First, blend titanium at least 99.5% pure and nickel at least 99.5% pure so that the atomic ratio is 1:1 between them. Then, insert this specimen into an arc furnace to create a $10^{-4}$ or $10^{-5}$ Torr of vacuum. Prepare an argon gas atmosphere, then apply the arc to dissolve the specimen. Turn the specimen several times so that the blend is homogeneous. Repeat the dissolution several times to make up the alloy. After completing dissolution, extract the specimen and crush it into pieces several millimeters in diameter. Insert these into a highly pressurized stainless steel container and extract air until a $10^{-2}$ Torr vacuum is created. Then, introduce hydrogen gas into the container, raise the pressure up to 30 bars, and heat the contents up to 250° C. Then, leave it for about 2 hours before cooling it to room temperature. Release the hydrogen gas and re-vacuum the container. Again feed hydrogen gas so that the pressure is 30 bar, then cause the TiNi alloy to absorb hydrogen. This completes the hydrogenation of the TiNi alloy. If the test result is unsatisfactory, repeat the entire procedure described above. Next, using agate mortar crush the hydrogenated TiNi alloy in the globe-box placed in the argon gas atmosphere so that the crushed powder particles are no longer than 44 microns each in diameter. Take out 0.1 gram of the particles, then add 0.01 gram of the conductive carbon. Finally, form pellets using a pelletizer. Next, blend 99.99% pure antimony pentaoxide with pure water and stir the mixture well. Dry the mixture at room temperature. Take 0.1 gram of the dried powder and form pellets using the pelletizer. If the mixture of antimony pentaoxide and water still does not provide proton conductivity, drop antimony pentachloride into pure water so that white precipitate can be generated. Then rinse, dry and use. Next, prepare manganese dioxide in the conventional manner and crush it into powder. 0.01 gram of the conductive carbon powder is then added to 0.1 gram of the crushed powder. Finally, pellets are formed using the pelletizer. The inventors experimentally connected the anode composed of TiNiHx, solid electrolyte Sb₂O₅ nH₂O, and the cathode MnO₂ to each other using lead terminals made of platinum plate and platinum wire, then slightly pressed the electrode using a laminated plastic plate called "Bakelite" and screw, then repeatedly charged and discharged it. This configuration is shown in FIG. 2. Reference number 5 indicates the anode, 6 the solid-state electrolyte, 7 the cathode, 8 the platinum-plates, 9 the platinum lead wires, 10 the laminated plastic plates, and 11 the screws. Finally, seal the battery with epoxy resin or a similar sealer.

Figure 3:
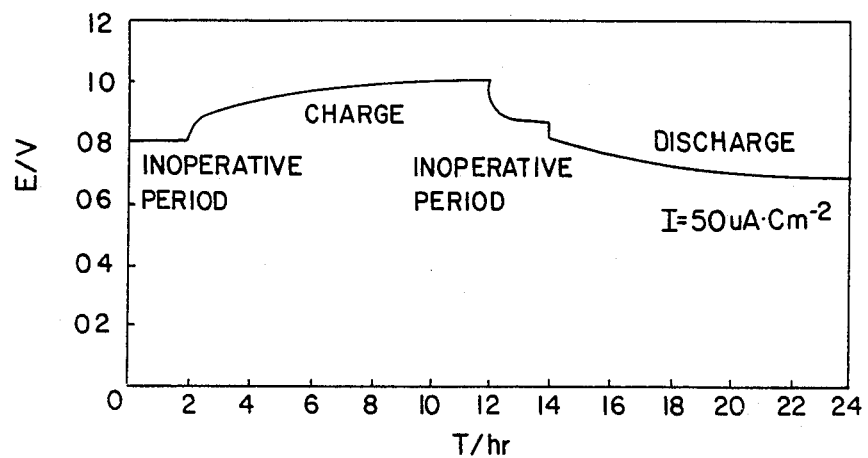
FIGS. 3 and 4 show the charge and discharge characteristics of the solid-state electrolytic battery of Example 1 after one and fifty cycles, respectively.
Figure 4:
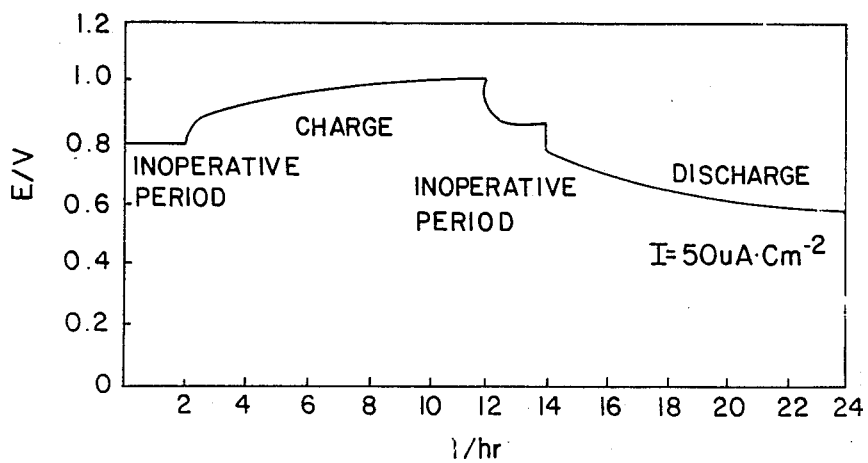

FIG. 3 shows the first charge/discharge cycle characteristics, whereas FIG. 4 shows the 50th charge/dis-

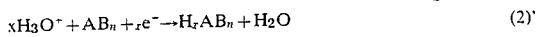

charge cycle characteristics. After completing these tests, it was confirmed that the solid-state electrolytic battery embodied by the present invention can be repeatedly charged and discharged. Likewise, after testing the activated cathode materials, such as $WO_3$ or $TiS_2$, the same satisfactory results as above were confirmed.

When such unique solid-state electrolytic batteries are completed, they are provided with a specific range of open-potentials according to the amount of moisture stored in the activated cathode material as the structural content, the blended amount of the conductive materials, and the hydrogen content stored in the activated anode materials. For example, after testing a number of these solid-state electrolytic batteries composed of Ti-NiHx/carbon, $Sb_2O_5nH_2O$, and $Y-MnO_2$/carbon, respectively, each of these batteries actually yielded 860 through a maximum of 1,250 mV of the open potentials, which are shown in Table 1 below.

TABLE 1

Open-potentials actually yielded by the solid-state electrolytic batteries incorporating the cathode containing hydrogen as a guest material and the anode comprised of the hydrogen-stored alloy (at 25° C.)

| Cathode | Anode | Open-potentials (mV) |
|---|---|---|
| $MnO_2$ | $TiNiH_x$ (x = 0.7) | 860 |
| $WO_3$ | $TiNiH_x$ (x = 1.2) | 460 |
| $TiS_2$ | $TiNiH_x$ (x = 1.2) | 380 |
| $MnO_2$ | $TiNiH_x$ (x = 1.3) | 1,200 |
| $NbS_2$ | $TiNiH_x$ (x = 1.2) | 280 |
| $VS_2$ | $TiNiH_x$ (x = 1.2) | 290 |
| $MoO_2$ | $TiNiH_x$ (x = 1.2) | 370 |
| $CrO_2$ | $TiNiH_x$ (x = 1.2) | 1,040 |
| $MnO_2$ | $LaNa_5H_x$ (x = 1.0) | 1,210 |
| $MnO_2$ | $CaNi_5H_x$ (x = 3.0) | 1,150 |
| $MnO_2$ | $TiNiMn_{0.007}H_x$ (x = 1.3) | 1,210 |
| $MnO_2$ | $TiNiMb_{0.01}H_x$ (x = 1.3) | 1,250 |

EXAMPLE 2

Figure 5:
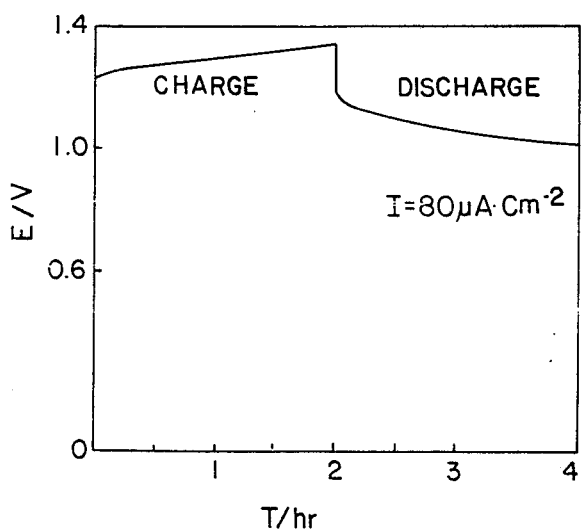
FIGS. 5 and 6 show the charge and discharge characteristics of the solid-state electrolytic battery of Example 2 after one and one hundred cycles, respectively.
Figure 6:
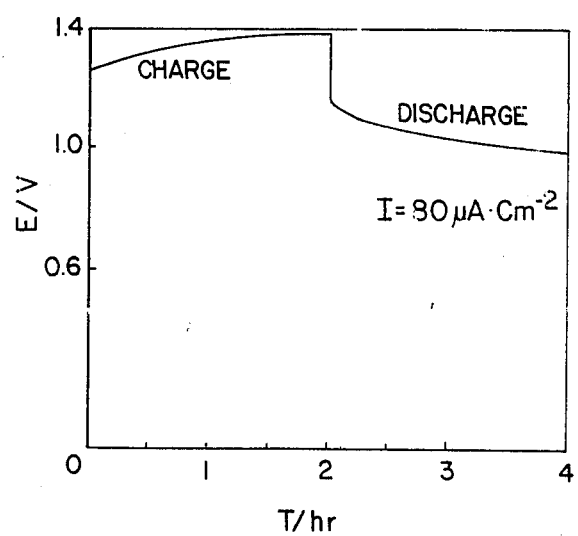

The inventors also manufactured special batteries according to a still further preferred embodiment of the present invention, which contained cathodes made from $MnO_2$, anodes made from $TiNiMn_{0.007}H_{1.4}$, and electrolyte made from $Sb_2O_5$ $5.5H_2O$. In addition, $Sb_2O_5$ $5.5H_2O$ and acetylene black were blended into the cathode and anode, respectively. The charge/discharge characteristics of these batteries are shown in FIGS. 5 and 6, respectively. FIG. 5 shows the charge/discharge characteristics measured during the first cycle at 25° C., whereas FIG. 6 shows these characteristics measured during the 100th cycle at 25° C.

As is clear from the above description, the unique solid-state electrolytic battery embodied by the present invention effectively uses activated hydrogen-stored alloy for the anode, solid-state hydrogen-ion conductive electrolyte, and materials, that absorb hydrogen as a guest. This battery has proven to be significantly useful in providing great potential advantages for all industries today.

What is claimed is:

1. A completely solid-state battery, comprising:
an anode material comprised of activated titanium nickel alloy storing metallic-hydrogenated hydrogen having a first and second surface;
a manganese dioxide or titanium disulfide cathode material capable of internally accommodating hydrogen-ions as a guest material having a first and second surface; and
a solid-state electrolyte comprised of a hydrogen-ion conductive element selected from the group consisting of phosphotungstate hydrate, stannic dioxide, antimony pentaoxide, zirconium oxide, aluminosilicate, a variety of matrix materials containing proton-imparted cation and solid-state high-polymer electrolyte composed of perfluorocarbon, said solid-state electrolyte being disposed between said anode and said cathode and being in direct contact with both said first surface of said anode and said first surface of said cathode.

2. The solid-state battery of claim 1, wherein said hydrogen-stored alloy is formed from at least 99.5% pure titanium and at least 99.5% pure nickel.

3. The solid-state battery of claim 2, wherein the atomic ratio of said titanium to said nickel is about 1:1.

4. The solid-state battery of claim 1, which is sealed with a sealer material.

5. The solid-state battery of claim 1, wherein said cathode material comprises manganese dioxide.

6. The solid-state battery of claim 1, wherein said cathode material contains conductive carbon powder.

7. The solid-state battery of claim 1, wherein said solid-state electrolyte contains $Sb_2O_5$.

8. The solid-state battery of claim 1, wherein said anode material contains hydrogenated titanium nickel alloy containing conductive carbon and said cathode material contains conductive carbon.

9. The solid-state battery of claim 1, which yields 860 through 1,250 mV of the open potentials.

10. The solid-state battery of claim 1, wherein said anode contains hydrogenated titanium alloy of the formula $TiNiH_x$ where x is 0.7 to 1.3.

11. The solid-state battery of claim 1, wherein said anode material contains both titanium and nickel and said cathode material contains manganese dioxide.

12. The solid-state battery of claim 1, further comprising a first conductive plate in contact with said second surface of said anode and a second conductive plate in contact with said second surface of said cathode.

13. The solid-state battery of claim 12, wherein said first and second conductive plates are platinum plates.

14. The solid-state battery of claim 12, which is sealed with a sealer material.

15. A completely solid-state battery, comprising:
an anode comprised of activated titanium nickel alloy storing metallic-hydrogenated hydrogen;
a solid-state electrolyte in contact with said anode and comprised of hydrogen-ion conductive elements selected from the group consisting of phosphotungstate hydrate, stannic dioxide, antimony pentaoxide, zirconium oxide, aluminosilicate, a variety of matrix materials containing proton-imparted cation and solid-state high-polymer electrolyte composed of perfluorocarbon; and
a manganese dioxide or titanium disulfide cathode in contact with said solid-state electrolyte and capable of internally accommodating hydrogen-ions as a guest material wherein hydrogen stored in the hydrogen-stored alloy reacts with the anode in the manner shown in formula (1) or (1)' thereby releasing hydrogen ions or $H_3O^+$ into the solid state electrolyte,

Metal: $H_x \rightarrow Metal + xH^+ = _xe^-$     (1)

$Metal-H_x + xH_2O = X_2O \rightarrow Metal + xH_3O^+ + _xe^-$     (1)' wherein Metal denotes the hydrogen-stored alloy which, after imparting an electron to hydrogen, stores hydrogen in a state very close to the anion, the ion released in the formula (1) or (1)' proceeds in the direction of the cathode via the solid-state electrolyte and on arrival at the cathode, the ion causes the following reaction (2) or (2)' to occur, thus absorbing hydrogen, $$xH^+ + AB_n + xe^- \rightarrow H_xAB_n \quad (2)$$

$$xH_3O^+ + AB_n + xe^- \rightarrow H_xAB_n + xH_2O \quad (2)'$$

wherein $AB_n$ represents a host material and wherein the overall reaction during discharge is shown in the formula (3) below $$\text{Metal} - H_x + AB_n \rightarrow H_xAB_n \quad (3).$$

16. A completely solid-state battery, consisting essentially of:

an anode material comprised of activated titanium nickel alloy storing metallic-hydrogenated hydrogen having a first and second surface;

a manganese dioxide or titanium disulfide cathode material capable of internally accommodating hydrogen as a guest material having a first and second surface; and a solid-state electrolyte possessing hydrogen ionic conductivity comprised of hydrogen-ion conductive elements selected from the group consisting of phosphotungstate hydrate, stannic dioxide, antimony pentaoxide, zirconium oxide, aluminosilicate, a variety of matrix materials containing proton-imparted cation and solid-state high-polymer electrolyte composed of perfluorocarbon, said solid-state electrolyte being disposed between said anode and said cathode and being in direct contact with both said anode and said cathode.

17. The solid-state battery of claim 16, wherein said cathode material is formed of $MnO_2$.

18. The solid-state battery of claim 16, wherein said cathode material contains $MnO_2$.

19. The solid-state battery of claim 16, wherein said cathode material contains $TiS_2$.

* * * * *